3,030,188
SYNTHESIS OF DIAMOND
William G. Eversole, Kenmore, N.Y., assignor to Union Carbide Corporation, a corporation of New York
No Drawing. Original application July 23, 1958, Ser. No. 750,309. Divided and this application Nov. 24, 1961, Ser. No. 154,838
9 Claims. (Cl. 23—209.4)

This invention relates to a method of producing diamond. More particularly, the invention relates to a method of growing diamond on seed crystals. This application is a division of my application Serial No. 750,309, filed July 23, 1958.

Heretofore, there has been a long search for a commercially acceptable method of producing diamond synthetically. A method involving conditions of very high temperature and pressure has been somewhat successful. Under the conditions of this method, diamond is the stable crystalline form of carbon. A method for deposition of diamond upon seed crystal under metastable conditions, however, has never been demonstrated.

It is an object of this invention to provide a method for producing diamond synthetically.

A further object of this invention is to provide a method for growing diamond on seed crystal.

It is another object of this invention to provide a method for increasing the size of commercial diamond dust.

Additional objects and advantages of the invention will become apparent from the following description and appended claims.

According to the present invention, carbon-containing gas is passed over seed crystals under proper conditions for growth of diamond on such seed crystal. Carbon is deposited as diamond on the seed crystal in spite of the fact that graphite is the stable form of carbon at the temperature and pressure used. In the usual case, particularly if the period of deposition is prolonged, black carbon in the form of graphite begins to interfere with the diamond growth process.

It has been observed that deposition of new diamond continues at an appreciable rate even after considerable black carbon has been deposited. This is unexpected since the depositing system is more supersaturated with respect to graphite than it is to diamond. When the deposit of black carbon interferes with diamond growth, the crystals may be freed of black carbon and diamond deposition reinstated.

Deposition occurs according to the following reactions:

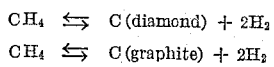

$$CH_4 \rightleftharpoons C(\text{diamond}) + 2H_2$$

$$CH_4 \rightleftharpoons C(\text{graphite}) + 2H_2$$

When these reactions are verified experimentally under the conditions of temperature and pressure specified for deposition in the process of the invention, it is observed that the diamond system approaches equilibrium faster than the graphite system. This indicates that diamond can be grown on seed crystals under metastable conditions.

Under the conditions of the invention, diamond is deposited at a much faster rate on the seed crystals than is black carbon. This is unexpected in view of the fact that thermodynamically, graphite is more stable than diamond.

The temperature and pressure of the invention must be such that the free energy potential of the carbon atoms in the carbon-containing gas is higher than the free energy potential of diamond carbon as well as graphite carbon. The free carbon system is thus supersaturated with respect to both diamond and graphite. Theoretically, diamond can be deposited in the temperature range of the invention throughout the pressure range in which diamond is metastable. For practical reasons, the reactions must proceed in the presence of their by-products and at pressures below atmospheric.

The invention will operate best in the temperature range of from about 900° C. to about 1100° C. because of insufficient diamond growth at lower temperatures and excessive black carbon deposition at higher temperatures. However, the temperature range in which the invention will operate is from about 600° C. to about 1600° C.

When a methyl group-containing gas is employed, the pressure may be one atmosphere or higher provided that the partial pressure of the methyl group-containing gas is less than about 75 mm. Hg. Best operation is obtained between 0.1 mm. and 5 mm. Hg pressure of the methyl group-containing gas.

Diamond is grown on the seeds until its growth is hampered by the accumulation of black carbon and then the seeds are cleaned to remove the black carbon. A growth step may then be repeated. The time required for a complete growth-cleaning cycle may vary from a few minutes to one or two hundred hours, depending upon conditions employed. Conveniently, one may use one-half to four hours of deposition and two to 16 hours of cleaning.

Where a methyl group-containing gas is used, a commercially pure grade of methane produces satisfactory results and impurities such as hydrogen, argon, nitric oxide, carbon dioxide and carbon monoxide can be tolerated in a reasonable amount. Other reactants can be used in place of methane, including ethane, propane, methyl chloride, methyl mercaptan and acetone. Materials such as benzene, carbon disulphide, methylene dichloride, carbon tetrachloride and hydrocarbons not containing methyl groups will not grow diamond by this process.

The principal use of natural diamond powder of the size on which it is commercially practical to grow diamond synthetically by this invention is as an abrasive or polishing powder. Commercial 0–1 micron grade diamond, which has an average particle diameter of 0.1 micron, is a satisfactory seed crystal for this invention. Good results have been obtained with 250 mesh diamond powder and diamond has been grown on stones as heavy as 22 mg. The rate of diamond deposition is a function of seed surface, and it was found that better rates of deposition are obtained with smaller seeds.

Following the period of diamond deposition, the particles may be cleaned, that is, black carbon may be removed. This graphitic carbon causes the particles to be darkened in appearance but upon cleaning, they become as white as the natural seeds before the deposition. Cleaning should be done if a further diamond deposition cycle is desired, as the accumulation of graphitic carbon on the surface of the seed crystal slowly reduces the rate of diamond growth.

Graphitic carbon is the non-diamond carbon deposited in the system. X-ray examination of such deposits in some instances show some very well-defined graphite, while sometimes it is very poor graphite.

The synthetic diamond can be cleaned by either a wet or dry method. The wet method involves heating the seeds in a sulfuric-nitric acid or a sulfuric-chromic acid mixture on a steam bath until substantially free of graphitic carbon. The sulfuric-chromic acid mixture is preferred as it has less tendency to attack diamond.

In the dry method, the diamond growth product is heated in the range of about 1000° C. to about 1100° C. under a hydrogen pressure of at least about 10 atmospheres until clean. A pressure of about 50 atmospheres is preferred. This method is more practical for the continuous cyclic production of diamond.

In the following examples, commercial diamond dust (0–1 micron), prior to use as seed crystal, was cleaned as follows to remove iron and other associated impurities. The powder was placed in a centrifuge tube and stirred with hot dilute aqueous HCl for several minutes. The solid was centrifuged out and the acid solution decanted. The process was repeated as long as a yellow "iron" color developed in the acid solution. The acid was removed from the seeds by washing with water, centrifuging and decanting several times, followed by drying of the seeds at 110° C.

Approximately 100 mg. of the cleaned powder was weighed into a vitreous silica tube or "boat" 100 mm. long, 3 to 3.5 mm. O.D. and closed at one end. The boat of diamond dust was further cleaned and dried by heating it in hydrogen at 750 p.s.i.g. and 1000° C. for 16 hours.

The boat of clean, dry diamond dust was placed in a larger silica tube in a "split tube" combustion furnace. The 1¼ inch diameter by 13 inch heating cavity of the furnace was reduced in diameter at the ends with sections of fire brick and asbestos to fit the silica tube. The sample was placed approximately at the center of the hot zone of the furnace.

The silica tube was connected to hard glass tubing through graded seals. The glass tubing ends were connected to a gas supply and to a vacuum system.

Temperatures were controlled by a recording and controlling potentiometer operating from a thermocouple located at the center of the furnace, outside of the silica tube. The pressure was measured by a MacLeod gage.

After bringing the furnace to the required temperature with the apparatus at full vacuum, methane was turned on to the desired pressure. At the end of the growth cycle, the methane flow and the furnace were turned off. When the boat of seeds was cool, it was weighed and returned to the hydrogen cleaning system for cleaning at about 750 p.s.i.g. and about 1000° C. until visually clean and then reweighed. The net gains were thus all based on the weight of the white, similarly cleaned product.

*Example I*

A sample, 373 mg. of 250 mesh grade of diamond powder, was treated in the above-described equipment for sixty-four hours at 1050° C. in a flowing stream of methane at 0.25 mm. of mercury pressure. The total gain in weight of the sample holder plus seeds was 7.77 mg. After cleaning in hydrogen until the powder was white in appearance and the vitreous silica sample holder clear and free of black carbon, the net gain of new diamond was 0.6 mg. or 0.16% of the initial seed weight.

*Example II*

In this example, a 102 mg. sample of 0–1 micron grade diamond was subjected to a methane atmosphere for sixteen hours at 1050° C. and 0.15 mm. mercury pressure. Total weight gain of tube and seeds was 24.4 mg. After hydrogen cleaning, the net gain of new diamond was 4.27 mg., 4.2 percent of the original seed weight.

Examples I and II show the relative effect of seed crystal size on rate of diamond deposition.

*Example III*

A 208 mg. sample of 0–1 micron grade diamond dust was subjected to a series of eight successive growth-cleaning cycles. Diamond precipitation periods were varied from about three to eighteen hours on individual cycles. The temperatures used varied from 1000° C. to 1100° C. and pressure from 0.15 mm. to 2.0 mm. of mercury. Both temperature and pressure were held constant during individual growth periods. Cleaning was with hydrogen, 50 atmospheres pressure at 1000° C. temperature for sixteen hours. The results are summarized as follows:

| Cycle | Temp., °C. | Pressure, mm. Hg | Growth Time, Hr. | Diamond Growth, Percent of Seed Wt. | Rate of Gain, Wt. Percent per Hour |
|---|---|---|---|---|---|
| 1 | 1,000 | 0.20 | 6 | 4.55 | 0.76 |
| 2 | 1,000 | 0.15 | 17.5 | 4.77 | 0.27 |
| 3 | 1,000 | 0.18 | 16 | 2.98 | 0.18 |
| 4 | 1,000 | 0.20 | 18 | 0.91 | 0.05 |
| 5 | 1,100 | 0.30 | 2.8 | 2.07 | 0.75 |
| 6 | 1,050 | 0.20 | 16 | 2.26 | 0.14 |
| 7 | 1,100 | 2.00 | 15 | 2.00 | 0.13 |
| 8 | 1,090 | 0.20 | 5.5 | 1.71 | 0.31 |

Total net gain = 21.2%.

This example indicates that rate of growth is less dependent on temperature and pressure within the ranges of 1000° C.–1100° C. and 0.15 mm.–2.0 mm. mercury than on the length of growth time. A short-term growth period gives a faster time rate of diamond precipitation.

The identity of the new growth as diamond in Example III is established by the following analytical data. Results on a hydrogen-cleaned specimen of the original seeds are included for comparison purposes.

| | Cycle 8 Crystals | H₂ Cleaned Original Crystals |
|---|---|---|
| Carbon content | 99.4±0.4 | 99.6±0.4 |
| Density g./cc. by flotation method | 3.48 | 3.49 |
| Electron diffraction $d_{hkl}$ values in Angstrom units | 2.03<br>1.25<br>1.07<br>graphite lines absent. | 2.05<br>1.26<br>1.07<br>graphite lines absent. |

In the following examples, the initial rate of diamond deposition was determined during four-hour growth periods. In Examples IV through VII the pressure was the same, 0.20 mm. of mercury, with temperatures of 900° C., 1000° C., 1100° C., and 1200° C. At 1200° C., black carbon was deposited with no detected diamond growth. At all other temperatures there were good rates of diamond deposition and the best results were obtained in the 1000° C. range.

In Examples VIII through XI, the pressure was varied. Individual runs were made at 1050° C. and at pressures of 0.03, 0.20, 0.28 and 0.46 mm. of mercury. Net gains of new diamond were obtained in all runs.

The diamond seed size was 0–1 micron and methane was the gas passed over the seeds. The time of each run was four hours except that Example XI was a three-hour run.

| Example | Diamond Seed, Wt., Mg. | Temp., °C. | Pressure, mm. Hg | Diamond Growth, Percent[1] | Rate of Gain, Percent/Hr. |
|---|---|---|---|---|---|
| IV | 228 | 1,200 | 0.20 | nil | nil |
| V | 187 | 1,100 | 0.20 | 4.62 | 1.13 |
| VI | 184 | 1,000 | 0.20 | 4.27 | 1.07 |
| VII | 213 | 900 | 0.20 | 1.22 | 0.31 |
| VIII | 128 | 1,050 | 0.03 | 0.97 | 0.25 |
| IX | 91 | 1,050 | 0.20 | 1.79 | 0.45 |
| X | 129 | 1,050 | 0.46 | 2.91 | 0.73 |
| XI | 1,050 | 1,050 | 0.28 | 2.59 | 0.86 |

[1] Percent of initial seed weight after cleaning with hydrogen.

Several combinations of methane with other gases were also tested. Ammonia appears to be the only material tested that seriously interferes with diamond growth.

In the following examples, the diamond seed size was 0–1 micron, the temperature was 1050° C. and the total pressure was 0.20 mm. of Hg in all examples except Example XIV and XXI.

| Example | Diamond Seed, Wt., Mg. | Growth Time, Hr. | Diamond Growth, Percent* | Rate of Gain, Percent/Hr. | Gas Composition |
|---|---|---|---|---|---|
| XII | 99 | 4 | 5.20 | 1.30 | $CH_4$ |
| XIII | 163 | 3.3 | 0.30 | 0.097 | 8.3% $NH_3$ in $CH_4$ |
| XIV [1] | 107 | 3 | 1.02 | 0.34 | 90% $H_2$ in $CH_4$ |
| XV | 171 | 4 | 2.36 | 0.59 | 10% $CH_3Cl$ in $CH_4$ |
| XVI | 141 | 4.1 | 2.23 | 0.56 | $CH_4$ |
| XVII | 104 | 4 | 1.75 | 0.44 | 10% NO in $CH_4$ |
| XVIII | 110 | 3.6 | 1.66 | 0.46 | 10% CO in $CH_4$ |
| XIX | 97 | 4.2 | 1.21 | 0.29 | 10% A in $CH_4$ |
| XX | 74 | 4 | 2.47 | 0.62 | 10% $CO_2$ in $CH_4$ |
| XXI [2] | 56 | 3 | 0.17 | 0.06 | 5% $CH_4$ in A |

*Percent of initial seed weight after cleaning with hydrogen.
[1] Total pressure was 3.14 mm. Hg.
[2] Total pressure was 760 mm. Hg and temperature was 1000° C.

Methyl group-containing gases other than methane that produced diamond in the above equipment are ethane, propane, acetone, methyl mercaptan and methyl chloride. The results are summarized in the following examples. No diamond growth could be detected with methyl amine, acetylene, benzene, carbon tetrachloride, methylene dichloride, or carbon disulphide. Apparently, either methane or compounds that decompose to methane or methyl radicals are needed.

In each of the following examples, the above-described apparatus was charged with 122 mg. of 0–1 micron diamond seed crystal.

| Example | Temp., °C. | Pressure, mm. Hg | Growth Time, Hr. | Diamond Growth, Percent [1] | Rate of Gain, Percent Hr. | Gas or Vapor |
|---|---|---|---|---|---|---|
| XXII | 1,050 | 0.2 | 3 | 0.8 | 0.27 | Acetone. |
| XXIII | 900 | 0.2 | 3 | 0.23 | 0.08 | Methyl Mercaptan. |
| XXIV | 1,050 | 0.2 | 4 | 0.76 | 0.19 | Propane. |
| XXV | 1,000 | 0.3 | 3 | 0.50 | 0.18 | Propane. |
| XXVI | 1,000 | 0.2 | 4 | 1.3 | 0.33 | Methyl Chloride. |
| XXVII | 1,000 | 0.40 | 4 | 0.76 | 0.19 | Ethane. |

[1] Percent of initial seed weight after cleaning.

*Example XXVIII*

An apparatus similar to, but considerably larger than that hereinbefore described, was charged with 939.2 mg. of 0–1 micron diamond dust and subjected to 85 successive growth-cleaning cycles as hereinbefore described. The methane gas pressure was varied between 0.26 mm. and 0.95 mm. of Hg and temperatures ranged from 995° C. to 1075° C. during the experiment. Each cycle consisted of 1.73 hrs. of growth and 4.5 hrs. of cleaning. After the eighty-fifth cycle, it was found that 59.5% new diamond had been added to the seeds.

The equipment used in the following examples consisted of a silica tube 4 mm. I.D., 12 mm. O.D., by 610 mm. long, attached through a graded seal and coupling to a U-shaped piece of 6 mm. I.D., 9 mm. O.D. copper tubing equipped with a valve for charging gas to the system. When assembled, the unit was a vertical rectangular closed loop of tubing about 20 by 24 inches, the silica tube forming the top and the U-shaped copper tube the bottom of and vertical sides of the rectangle.

The silica tube was heated by an electric furnace equipped to maintain a constant temperature condition over a range of about 800° C. to 1200° C. The diamond seed sample weighing about 100 mg. was placed in a small, thin-walled silica tube, 3 mm. O.D. by 100 mm. long, which was placed in the heated section. This sample holder was required only for accurate weighing to determine the diamond growth. Essentially all black carbon deposited within the apparatus during runs that produced diamond growth was deposited on the seed crystals and not on the walls of the furnace tube or sample holder. The quantity of diamond and black carbon deposited was determined by weighing the seeds before and after cleaning.

From the examples hereinabove set forth, wherein substantial diamond growth was realized, it would appear that those materials which may be decomposed to a methyl radical, under the conditions of temperature and pressure set forth, would serve as suitable reactants for the production of diamond.

Commercial grades of diamond powder, usually 0–1 micron grade, were used in all tests. It was found that some original seed lots contained materials that attacked the silica sample holder, making accurate growth measurements difficult. Such materials were removed by cleaning with hydrochloric acid and washing and drying before use.

Thermal circulation of gas over the seeds was obtained by heating one leg of the unit or by slightly tilting the entire apparatus. The quantity of gas in the unit was such that there was no significant change in composition during the growth experiments.

Electron diffraction is particularly adaptable to the evaluation of this synthetic diamond material as it reveals the characteristics of layers near the surface. Only the diamond lines are present. After cleaning, not even the major graphite lines, 3.35 and 1.22 Angstroms, were observed while these were present on the dark colored product before cleaning.

In the following claims, the term "diamond seed crystals" is defined as particles of crystalline material that have crystallographic lattice parameters close to that of natural diamond and upon which carbon atoms can be placed so as to be in positions nearly the same as the positions of the carbon atoms in a diamond surface. This will usually be, but is not limited to, diamond seed crystals.

What is claimed is:

1. A process for growing diamond on diamond seed crystal which comprises providing diamond seed crystal; contacting said diamond seed crystal with a gas which is at least partially decomposable to a free methyl radical at temperatures between about 600° C. and about 1600° C. and pressures at which the partial pressure of the gas decomposable to a free methyl radical is less then about 75 millimeters of mercury.

2. A process for growing diamond on diamond seed crystal which comprises providing diamond seed crystal; contacting said diamond seed crystal with a gas selected from the group consisting of methane, ethane, propane, acetone, methyl mercaptan and methyl chloride at temperatures between about 900° C. and about 1100° C. and pressures at which the partial pressure of the selected gas is less than about 75 millimeters of mercury.

3. A continuous process for growing diamond on diamond seed crystal in a diamond growth zone which comprises providing diamond seed crystal; contacting said diamond seed crystal in said diamond growth zone with a gas which is at least partially decomposable to a free methyl radical at temperatures between about 600° C. and about 1600° C. and pressures at which the partial pressure of the gas decomposable to a free methyl radical is less than about 75 millimeters of mercury thereby growing diamond and simultaneously depositing black carbon in said diamond growth zone; and periodically terminating the flow of said gas decomposable to a free methyl radical and treating said diamond growth zone with a cleaning agent for removal of black carbon deposited therein.

4. A continuous process for growing diamond on diamond seed crystal in a diamond growth zone which comprises providing diamond seed crystal; contacting said diamond seed crystal in said diamond growth zone with a gas selected from the group consisting of methane, ethane, propane, acetone, methyl mercaptan and methyl chloride at temperatures between about 600° C. and about 1600° C. and pressures at which the partial pressure of the selected gas is less than about 75 millimeters of mercury thereby growing diamond and simultaneously depositing black carbon in said diamond growth zone; periodically terminating the flow of selected gas; and treating said diamond growth zone with a cleaning agent for removal of black carbon deposited therein.

5. A continuous process for growing diamond on diamond seed crystal in a diamond growth zone which comprises providing diamond seed crystal; contacting said diamond seed crystal in said diamond growth zone with a gas selected from the group consisting of methane, ethane, propane, acetone, methyl mercaptan and methyl chloride at temperatures between about 900° C. and about 1100° C. and pressures at which the partial pressure of the selected gas is less than about 75 millimeters of mercury thereby growing diamond and simultaneously depositing black carbon in said diamond growth zone.

6. A continuous process for growing diamond on diamond seed crystal in a diamond growth zone which comprises providing diamond seed crystal; contacting said diamond seed crystal in said diamond growth zone with a gas selected from the group consisting of methane, ethane, propane, acetone, methyl mercaptan and methyl chloride at temperatures between about 600° C. and about 1600° C. and pressures at which the partial pressure of the selected gas is less than about 75 millimeters of mercury thereby growing diamond and simultaneously depositing black carbon in said diamond growth zone; periodically terminating the selected gas contacting; and treating said diamond growth zone with hydrogen gas at temperatures between about 1000° C. and about 1100° C. and pressures between about 10 atmospheres and about 50 atmospheres for removal of black carbon deposited therein.

7. A continuous process for growing diamond on diamond seed crystal in a diamond growth zone which comprises providing diamond seed crystal; contacting said diamond seed crystal in said diamond growth zone with a gas selected from the group consisting of methane, ethane, propane, acetone, methyl mercaptan and methyl chloride at temperatures between about 900° C. and about 1100° C. and pressures at which the partial pressure of the selected gas is less than about 75 millimeters of mercury thereby growing diamond and simultaneously depositing black carbon in said diamond growth zone; periodically terminating the selected gas contacting; and treating said diamond growth zone with hydrogen gas at temperatures between about 1000° C. and about 1100° C. and pressures between about 10 atmospheres and about 50 atmospheres for removal of black carbon deposited therein.

8. A continuous process for growing diamond on diamond seed crystal in a diamond growth zone which comprises providing diamond seed crystal; contacting said diamond seed crystal in said diamond growth zone with a gas selected from the group consisting of methane, ethane, propane, acetone, methyl mercaptan and methyl chloride at temperatures between about 900° C. and about 1100° C. and pressures at which the partial pressure of the selected gas is less than about 75 millimeters of mercury thereby growing diamond and simultaneously depositing black carbon in said diamond growth zone; periodically terminating the selected gas contacting; removing the grown diamond and seed crystal mixture from said diamond growth zone; treating the mixture with a chromic acid-sulphuric acid cleaning agent at about 100° C. and atmospheric pressure for removal of black carbon; completely removing the acid cleaning agent from the black carbon depleted grown diamond and seed crystal mixture; and returning the diamond mixture to said diamond growth zone.

9. A continuous process for growing diamond on diamond seed crystal in a diamond growth zone which comprises providing diamond seed crystal; contacting said diamond seed crystal in said diamond growth zone with a gas selected from the group consisting of methane, ethane, propane, acetone, methyl mercaptan and methyl chloride at temperatures between about 900° C. and about 1100° C. and pressures at which the partial pressure of the selected gas is less than about 75 millimeters of mercury thereby growing diamond and simultaneously depositing black carbon in said diamond growth zone; periodically terminating the selected gas contacting; removing the grown diamond and seed crystal mixture from said diamond growth zone; treating the mixture with a sulfuric acid-chromic acid cleaning agent at about 100° C. and atmospheric pressure for removal of black carbon; completely removing the acid cleaning agent from the black carbon depleted grown diamond and seed crystal mixture; and returning the diamond mixture to said diamond growth zone.

References Cited in the file of this patent

FOREIGN PATENTS

| | | |
|---|---|---|
| 804 | Great Britain | 1880 |
| 377,239 | Great Britain | July 21, 1932 |